United States Patent
Karthikeyan et al.

(10) Patent No.: US 10,788,959 B2
(45) Date of Patent: *Sep. 29, 2020

(54) PERSONALIZATION OF A WEB APPLICATION

(71) Applicant: International Business Machines Corporation, Armonk, NY (US)

(72) Inventors: Sailatha Karthikeyan, Bangalore (IN); Sachin Prasad, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 116 days.

This patent is subject to a terminal disclaimer.

(21) Appl. No.: 14/818,593

(22) Filed: Aug. 5, 2015

(65) Prior Publication Data
US 2016/0179317 A1    Jun. 23, 2016

Related U.S. Application Data

(63) Continuation of application No. 14/576,240, filed on Dec. 19, 2014.

(51) Int. Cl.
| | |
|---|---|
| G06F 3/00 | (2006.01) |
| G06F 3/0484 | (2013.01) |
| G06F 3/0481 | (2013.01) |
| H04L 29/08 | (2006.01) |
| G06F 16/958 | (2019.01) |
| G06F 3/01 | (2006.01) |
| G06F 40/169 | (2020.01) |

(52) U.S. Cl.
CPC .......... *G06F 3/0484* (2013.01); *G06F 3/0481* (2013.01); *G06F 16/958* (2019.01); *H04L 67/02* (2013.01); *H04L 67/125* (2013.01); *H04L 67/306* (2013.01); *G06F 40/169* (2020.01)

(58) Field of Classification Search
CPC .. G06F 3/0484; G06F 3/0481; G06F 3/04845; G06F 3/0486
See application file for complete search history.

(56) References Cited

U.S. PATENT DOCUMENTS

| | | | |
|---|---|---|---|
| 6,957,390 B2 | 10/2005 | Tamir et al. | |
| 7,194,678 B1 * | 3/2007 | Koike | G06F 16/972 715/234 |
| 7,458,021 B2 * | 11/2008 | Balasubramanyan | G06F 40/186 715/235 |
| 7,461,340 B1 * | 12/2008 | Mauceri, Jr. | G06F 40/177 715/243 |
| 8,799,829 B2 | 8/2014 | Grosz | |

(Continued)

OTHER PUBLICATIONS

Sailatha Karthikeyan et al., Pending U.S. Appl. No. 14/576,240 entitled "Personalization of a Web Application" filed with the U.S. Patent and Trademark Office on Dec. 19, 2014.

(Continued)

*Primary Examiner* — Nicholas Augustine
(74) *Attorney, Agent, or Firm* — Cantor Colburn LLP; Farrokh Pourmirzaie

(57) ABSTRACT

According to an aspect, personalization of a web application includes providing, by a processor, an interface for receiving a preference as an input. A request for generation of a web application is received by the processor, and the web application is generated by the processor based on the preference.

6 Claims, 5 Drawing Sheets

(56) References Cited

U.S. PATENT DOCUMENTS

| | | | |
|---|---|---|---|
| 9,684,733 B2* | 6/2017 | Niddapu | G06F 17/30905 |
| 2002/0019827 A1* | 2/2002 | Shiman | G06F 16/93 |
| 2003/0131070 A1* | 7/2003 | Stroebel | G06F 16/957 |
| | | | 709/217 |
| 2003/0233425 A1* | 12/2003 | Lyons | H04L 29/12009 |
| | | | 709/217 |
| 2004/0003031 A1* | 1/2004 | Brown | G06F 16/95 |
| | | | 709/203 |
| 2004/0243930 A1* | 12/2004 | Schowtka | G06F 40/106 |
| | | | 715/243 |
| 2005/0246283 A1* | 11/2005 | Gwiazda | G06Q 10/10 |
| | | | 705/52 |
| 2006/0235984 A1* | 10/2006 | Kraus | G06F 16/958 |
| | | | 709/228 |
| 2007/0136201 A1* | 6/2007 | Sah | G06Q 99/00 |
| | | | 705/51 |
| 2008/0201242 A1 | 8/2008 | Minnis et al. | |
| 2009/0265607 A1 | 10/2009 | Raz | |
| 2011/0307551 A1* | 12/2011 | Danezis | G06Q 10/10 |
| | | | 709/204 |
| 2011/0320957 A1 | 12/2011 | Tiddens | |
| 2013/0036383 A1 | 2/2013 | Yuan | |
| 2013/0191314 A1* | 7/2013 | Li | G01C 21/3484 |
| | | | 706/46 |
| 2014/0075385 A1* | 3/2014 | Wan | G06Q 10/1093 |
| | | | 715/812 |
| 2014/0108977 A1 | 4/2014 | Queck et al. | |
| 2014/0143252 A1 | 5/2014 | Silverstein | |
| 2014/0237610 A1* | 8/2014 | Vandervort | G06F 21/60 |
| | | | 726/26 |
| 2015/0154660 A1* | 6/2015 | Weald | H04L 67/42 |
| | | | 705/14.73 |
| 2016/0283460 A1* | 9/2016 | Weald | G06Q 30/0277 |

OTHER PUBLICATIONS

List of IBM Patents or Patent Applications Treated as Related (Appendix P), Filed Aug. 5, 2015, 2 pages.

* cited by examiner

PERSONALIZATION OF A WEB APPLICATION

DOMESTIC PRIORITY

This application is a continuation of U.S. patent application Ser. No. 14/576,240, filed Dec. 19, 2014, the content of which is incorporated by reference herein in its entirety.

BACKGROUND

The present disclosure relates generally to generating a web application, and more specifically, to generating a personalized web application based on user preference.

Generally, a web application which is presented at a user interface has a preconfigured display of information. The display of information varies from one web page to another web page of the web application. Since the information is not consistent, a user spends time to extract relevant web page information being displayed at the users' interface. As a result, the user is required to consistently understand a look and feel of each web page being displayed.

Hence, the user is always engaged in a time consuming task of figuring out container information in the web application to be at ease in the understanding of information being displayed at the user interface.

SUMMARY

Embodiments include a method, system, and computer program product for personalization of a web application. The method includes providing, by a processor, an interface for receiving a preference as an input. A request for generation of a web application is received by the processor, and the web application is generated by the processor based on the preference.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
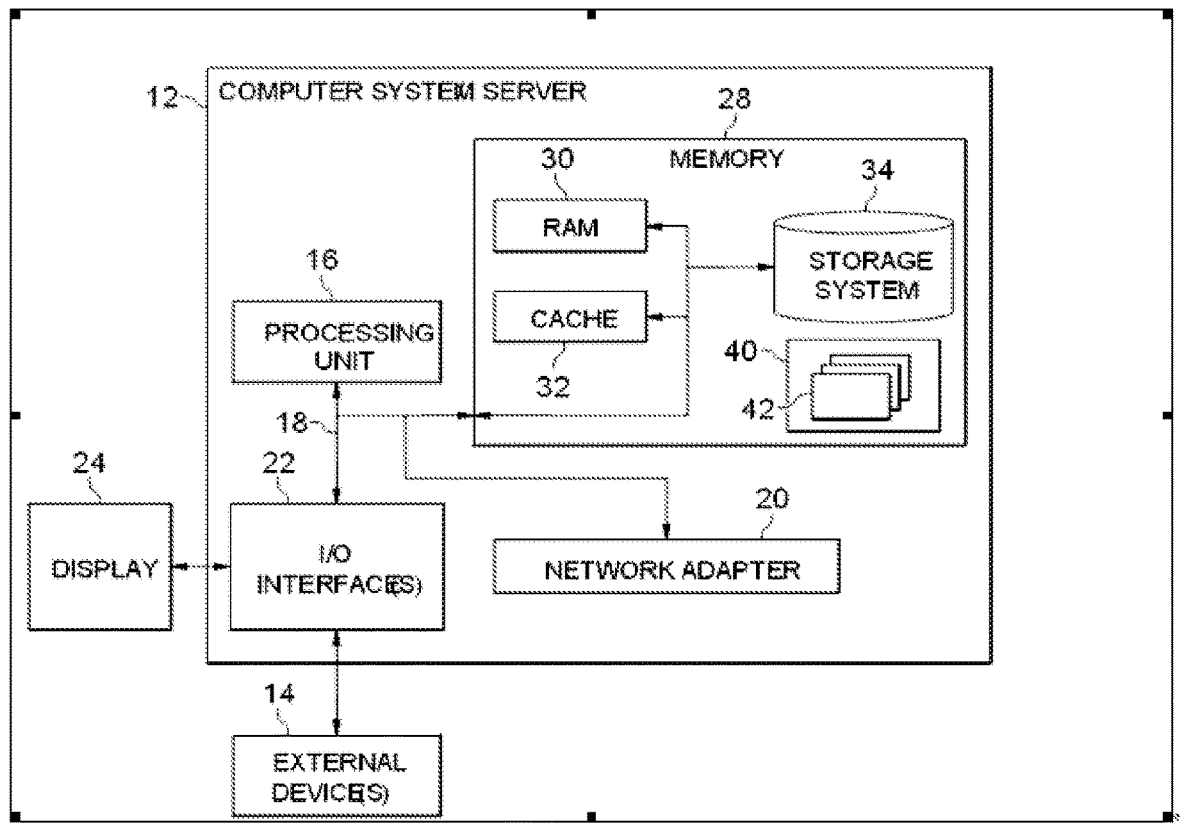
FIG. 1 illustrates a block diagram of an exemplary computer system/server 12 which is applicable to implement the embodiments.

Referring now to FIG. 1, in which a block diagram of an exemplary computer system/server 12 which is applicable to implement embodiments is generally shown. Computer system/server 12 shown in FIG. 1 is only illustrative and is not intended to suggest any limitation as to the scope of use or functionality of embodiments described herein As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including the system memory 28 and the processing units 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown in FIG. 1 and typically called a "hard drive"). Although not shown in FIG. 1, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18 by one or more data media interfaces. As will be further depicted and described below, memory 28 may include at least one program product having a set (e.g., at least one) of program modules that are configured to carry out the functions of embodiments described herein.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiment described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Tag: A tag is a metadata to describe content or context of the user and/or the preference with which it is associated. The tag may be utilized to cull information on the preference provided. The tag may be associated with the user to identify the preference corresponding to a component such as elements/functions/controls, the preference being applied to shape the setup of the web application. The tag may be utilized to identify the respective component with the preference as inputted by the user. The tag may further associate the component and its corresponding attributes such as size color, font etc. The tag may additionally associate the component with its related code (snippet), for example, HTML snippet being associated to the related component. The tag may be used to identify in a document its data that can be associated to the preference, the document being received in response to the request for generating the web application. The tag may be utilized to retrieve the preference corresponding to the component as inputted by the user. The tag may be utilized for integrating values/encodings/web-annotations of the respective component related to the preference such that the web application is generated as per the preference provided by the user.

Web-Annotations: Web-annotations are a predefined set of markers to highlight on context of the components such as elements, functions, features, controls, and/or widgets of the web application at a code level. The web-annotations may be represented as identifiers to identify the nature of content being provided. The web annotations may use certain agreed upon keywords for the one or more components, which can be utilized as standard terms. The standard web-annotations may facilitate a web browser to understand what the keyword represents. The web-annotations may be associated with respective one or more preferences to obtain standardized preferences. The browser may on identifying the web-annotations construct from its keyword the context for the component/preference, for example, make out where the respective component/preference is to be located in the web application.

Flag: A flag is a software or hardware element that signals a particular condition or status. The flag may be set in user's client browser. The flag is like a switch that can be either on or off, true or false, or enabled or disabled. The flag is said to be set when it is turned on or enabled. If the flag is on/enabled, the web application is configured based on the user's inputted preference.

Embodiments herein provide for personalization of a web application being generated. A display screen as a platform is provided to a user to define a preference for one or more components which may be collectively used to compose the web application. A software tool such as a web configuration tool may allow the user to define the preference. When the user inputted preference is applied by the web configuration tool to a document received (at a server), the web configuration tool causes a layout of the web application configured based on the user provided preference. A generation of the web application based on the preference as provided by the user may lead to synchronization in the look and feel across the web application. The preference once recorded may be adoptive for the layout of the web application that the user may visit in future.

A plurality of components such as a function, element, widget, feature, attribute or control may collectively form part of the web application. The term preference as used herein is meant to reference the component that may form part of the information used for composition of the web application. The component may be an application, the content of which can be defined by the user. The user defined component's content is the preference as inputted/provided by the user. In other words, the user inputted/provided preference is a user defined preference for the respective component. The preference may be for one component or plurality of components forming part of the web application.

The web application may be configured and generated for display at the user's interface as per the preference inputted by the user. The user inputted preference is applied for generation of the personalized web application. The web configuration tool may be configured to retrieve a user inputted preference characterizing the component and associated to the user such that the web application is generated based on the preference. The web configuration tool may be additionally configured to analyze data or information in a document or page as received (based on request). The user defined preference may be integrated to data/information forming part of the document received corresponding to the requested web application before being generated and displayed at the user interface. The method herein provides several options allowing retrieval of the preference from a repository and assembling the data or information based on the preference. Accordingly, various embodiments may implement a method of personalizing the web application in conjunction with the preference to configure and generate the web application based on the preference as defined by the user.

Terms such as element, attribute, function, control or widget may be used interchangeably to refer to component forming part of composition of the web application.

Terms such as web application or web page may be used alternately.

Terms such as HTML snippets or HTML data or HTML elements as used herein are not meant in any way to limit the scope to using HTML editor, but are meant to include any mark-up language.

The discussion will begin with a description of a method in accordance with an embodiment that allows for generating the web application which is configured as per the preference provided at a user interface.

When the user requests the web application, at least a web page of the web application is displayed at the user interface having a predefined layout and design. The web page of the web application displays various components which exemplify its content. For example, a function, control, widget or any element may form part of a context (on the web page) being displayed at the user interface. The components may describe the context and can be seen, heard or interacted with. The context may be textual, non-textual, interactive or hidden internal information.

Classically, the web application carries static information for a simple view. Personalization is presentation of content of the web application based on user defined preference. In other words, contents of the web page of the web application can be manipulated by the user. The preference may be for the component in the web application that can be seen, heard or interacted with. When a request for the web application is made, the web configuration tool is adapted to intercept data/information of a received document (in a server) and integrate an associated preference into the received page such that data as in supplied web page source is adjusted or reloaded with the integrated preference before being supplied to the browser.

Figure 2:
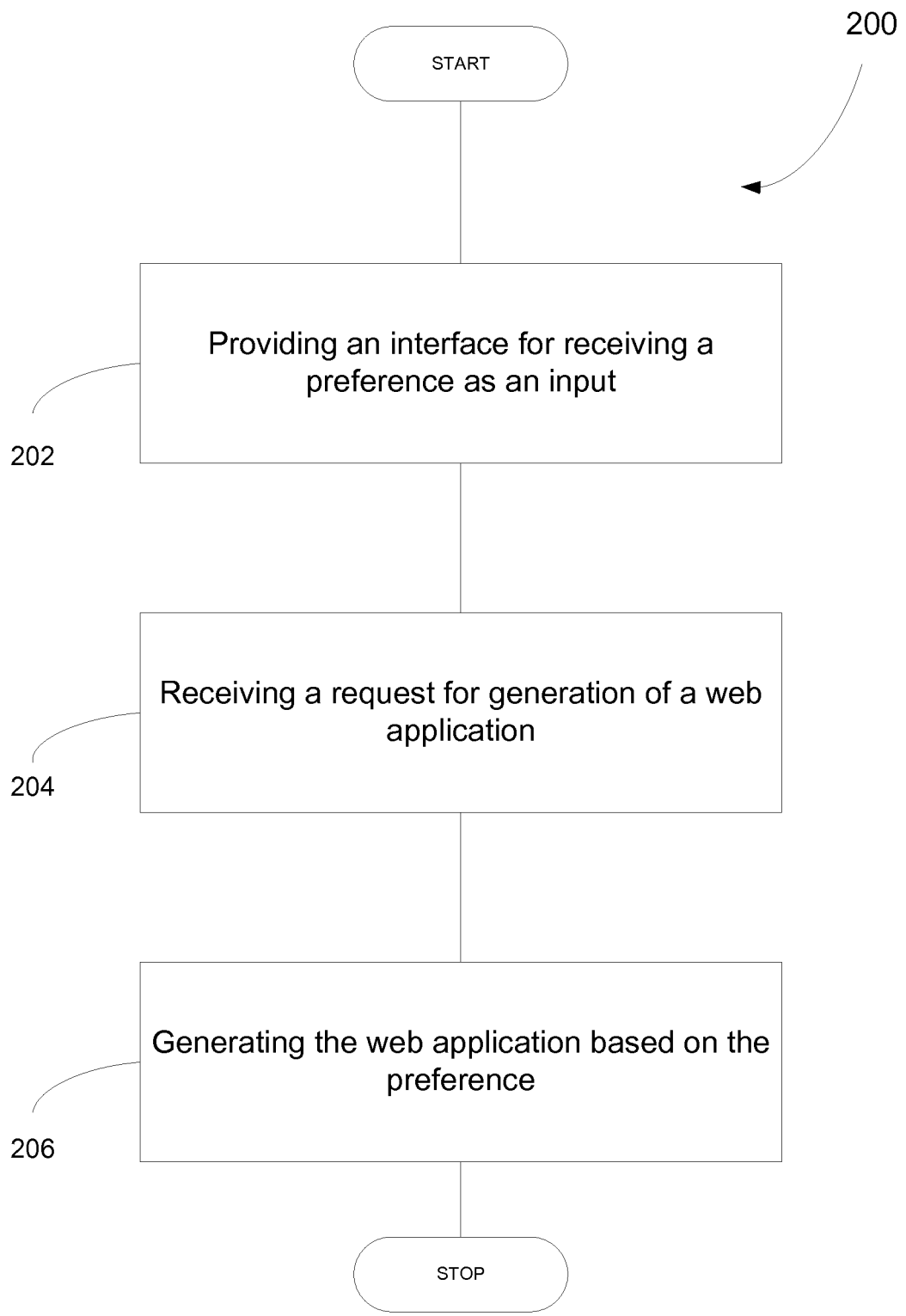
FIG. 2 illustrates an exemplary schematic flowchart depicting a process for personalization of the web application according to an embodiment.

With reference now to FIG. 2, one embodiment provides a non-limiting mechanism for personalizing the web application based on the user preference in accordance with an embodiment.

The method includes, at block 202, providing an interface for receiving a preference as an input; at block 204, receiving a request of a web application; and at block 206, generating the web application based on the preference inputted.

At block 202, an interface is provided for receiving the preference as an input. In one example the preference may be inputted at a display screen such as a graphic user interface (GUI).

A user may be allowed to define an appearance of the web application by making a selection of an environment for the webpage. When a user logs in or connects to an internet connection the user may be allowed to register his identity. In one embodiment, the user interface may provide a help mechanism that allows a first time user to register an identity.

The user may compose the look and feel on various components which may be configured together to define the appearance of the web application. The user may define the web application by either creating a new preference or making the manipulation to existing components having predefined attributes (features). At the interface, there may present a pop-up, requesting the user to input the preference corresponding to a component.

The preference for various components may be later used as a configuration setting to compose the web application. The user may be allowed a text box control or a button control or a label control to either create the preference or to access a database containing a plurality of predefined attributes corresponding to the one or more components. In an embodiment, the preference may be manually created at a display of the user's device using canvas. In one embodiment, the preference may be defined by selecting from predefined attributes characterizing various components. In one implementation, the list of plurality of predefined attribute (specifications) of the components may be provided by a commercial database or library sponsored by any service provider.

The preference may characterize a component by defining its content, styling, and interface. In one example, the preference may describe a pattern of the user interface (UI) component specification, cascading style sheets (CSS) specification, theme, or content location specification, etc. In another example, the preference may be feeds on bottom, advertisement on top, log out button on right corner, search related boxes on top left.

Attributes defining user inputted preference for example, location, font, text color, width, margins etc. may be recorded as values, specific to the respective component. While the user defines the preference, the inputted attributes may be tracked and collected. The inputted attributes as modified are captured from the display screen interface. In one example, values may be recorded as integers.

In one embodiment, the preference can be tracked by associating a tag to the preference with the user. The tag may be used to associate each of the user defined preference corresponding to the one or more components distinctly to the respective user. In one embodiment, the inputted preference may be tagged to one or more websites or web based applications.

The information concerning the inputted preference may be collected and stored in a repository. The repository may include the user's activity and log time. The repository may contain records specific to the user as well as application specific activities. The activities include user's identification, user's preferences, application identification, application characteristics and application configuration settings.

The repository may maintain a database of the collection of the preferences defined by the user. In one embodiment, the repository may maintain database based on the tag associated to the user and the preference as inputted by the user. In one example, the database may have the preference and the associated one or more components. The database may include record of the captured value (attributes) along with the inputted preference in the repository. In one implementation, the manually created preference may be updated to the database corresponding to the one or more components. In one embodiment, the track of the preference as inputted by the user may be updated on an ongoing basis.

In one embodiment, the data from the repository may be retrieved using the associated tag.

In one implementation, the repository may be maintained at the user device. In an embodiment, the repository containing the preference may be stored on a cookie in the user device. In one embodiment, the repository may be maintained at a server. In another embodiment, the repository may be hosted at any third party service provider.

Once the preference for the web application is defined, that defined preference is the preference inputted/provided by the user for configuring the web application. The defined preference may be applied to the web application being loaded on the user's device before being generated. The preference as provided by the user corresponding to the one or more components can be integrated together as an adaptable solution to generate the web application.

At block 204, a request for visiting the web application may be made. The universal resource locator (URL) of the requested web application is tracked and identified so as to fetch a requested document. The document may contain a data describing content symbolizing the components, required for constructing a setup of the requested web application for display at the user interface. In one example, the fetched document may be a HTML document or XML document. In one example, the fetched document containing code of various components (data/information) forming part of the web application is received at a server.

At block 206, when the document containing data representing the requested web application is received (at the server), the data may be manipulated before being configured for generation of the web application. Since the document is composed of plurality of components, data can be manipulated for the respective one or more components forming part of the requested web application. In other words, after the request for the web application is made, content in the document for the one or more components corresponding to the requested web application may be changed.

In an embodiment, on receiving the document, content of the document is examined to determine, whether there exists the preference as inputted by the user. In one embodiment, it may be further determined whether the preference corresponds to the requested web application. From the received document having data/information of the various components, it may be verified that the preference can be associated to which component of the document received. After this determination, the preference is associated to the respective component forming part of the document. In one embodiment, value in the preference is mapped to the identified data representing the identified component in the received document. In one implementation, an HTML snippet (code) corresponding to the preference is retrieved from the repository to be integrated in the received document. In one embodiment, where it is determined that the preference is specific to the web application, the preference as associated to the respective web application is retrieved for integrating into the received document.

In one implementation, an identity of the preference and the corresponding HTML snippet may be derived using the associated tag. The tag may map the data as in the received document and the preference such that the HTML snippet associated with the preference is retrieved and integrated into the received document corresponding to the identified component.

Once the preference (containing code) is integrated into the received document, the changed/modified document is forwarded to a device making the request for the generation of the web application.

In one implementation, web-annotations may be used to standardize the nature of content being provided at a code level. The web-annotations are predefined set of mark ups which may be employed at the code level to represent various components. The web-annotations may serve as identifiers corresponding to the preference received as input. In one embodiment, the user provided preferences may be standardized with the corresponding web-annotations. In one embodiment, the web-annotations exhibiting the components may use keywords as identifiers to associate with the respective preference. In one embodiment, the keywords as in the web-annotations and the preferences may be associated using the tag. In one implementation, the tag may be used later to identify and retrieve the preference and the associated web-annotation. In one implementation, the standardized web-annotations may form part of the HTML snippets to associate with the preference. The standardized preferences may be mapped to the data forming part of the received document.

In one implementation, the keywords as in the web-annotations may be used to identify the respective components in the received document and the preferences as provided by the user. At the code level, the received document may include place holders of the keywords to represent the components forming part of the web application. The place holders of the web-annotations may identify a location of the components in the received document.

The tag may enable the association of the keywords as in the web-annotation (in the received document) and establish the identity to the corresponding preference. Once the keywords representing the respective web-annotations (as in the received document) are identified and their association with the corresponding preference (as retrieved from the repository) is established using tags, the values as in the preference may be integrated into the existing data (document as received) without replacing the application data as a whole corresponding to the respective component.

Following is an example of standardizing the preference corresponding to the component (a function/element/control/widget) with the respective web-annotation to obtain the standardized preference. The code below provides a login feature (keyword) which has a logic button, text fields and a link. As a preference, line number 2-7 may be fixed as a login feature. This marking is done at line number 1. COM.XXX.WEBANNOTATION.LOGIN is one example of the web-annotation.

```
1       @COM.XXX.WEBANNOTATION.LOGIN
2       <div>
3           <Button>Login</Button>
4           <Text>Username</Text>
5           <Text>Password</Text>
6           <Link>Forgot Password ?</Link>
7       </div>
```

A few other examples of the web-annotations are listed below.

```
            @web-annotation
            <div ... "advtBox">
            @web-annotation
            <div ..."socialBox">
            @web-annotation
            <div ..."feedsBox">
            @web-annotation
            <div ...="SearchBox">
            @web-annotation
            <div ...="LogoutBox">
```

In one embodiment, the web application may be generated based on the preference when a flag is enabled. The flag may be activated by the user, on clicking at an icon or a button on the display screen at the graphical user interface. In another embodiment, the flag may be enabled automatically when the user connects to the internet. The identity of the user is recognized as a registered client with a prior history.

In one embodiment, when the flag is enabled, and the request for generating the web application is received, the preference associated with the user is retrieved from the repository such that the web application is generated based on the user defined preference.

In one implementation, when the flag is enabled and the preference specific to the web application is retrieved, the web application may be generated based on user provided preference specific to the web application. In response to the request for the web application, data in the document received is modified as per the preference, for generating the web application being displayed at the user interface as per the user defined preference.

In a situation, where the flag is disabled, the user may be prompted to enable the flag such that the web application may be generated as per the user defined preference. In another embodiment, when the flag is disabled, the web application may be generated as per data received in the document without modifying the data for generating the web application based on the user defined preference.

The above embodiments may combine together and cross-reference, thereby resulting in more embodiments.

Figure 3:
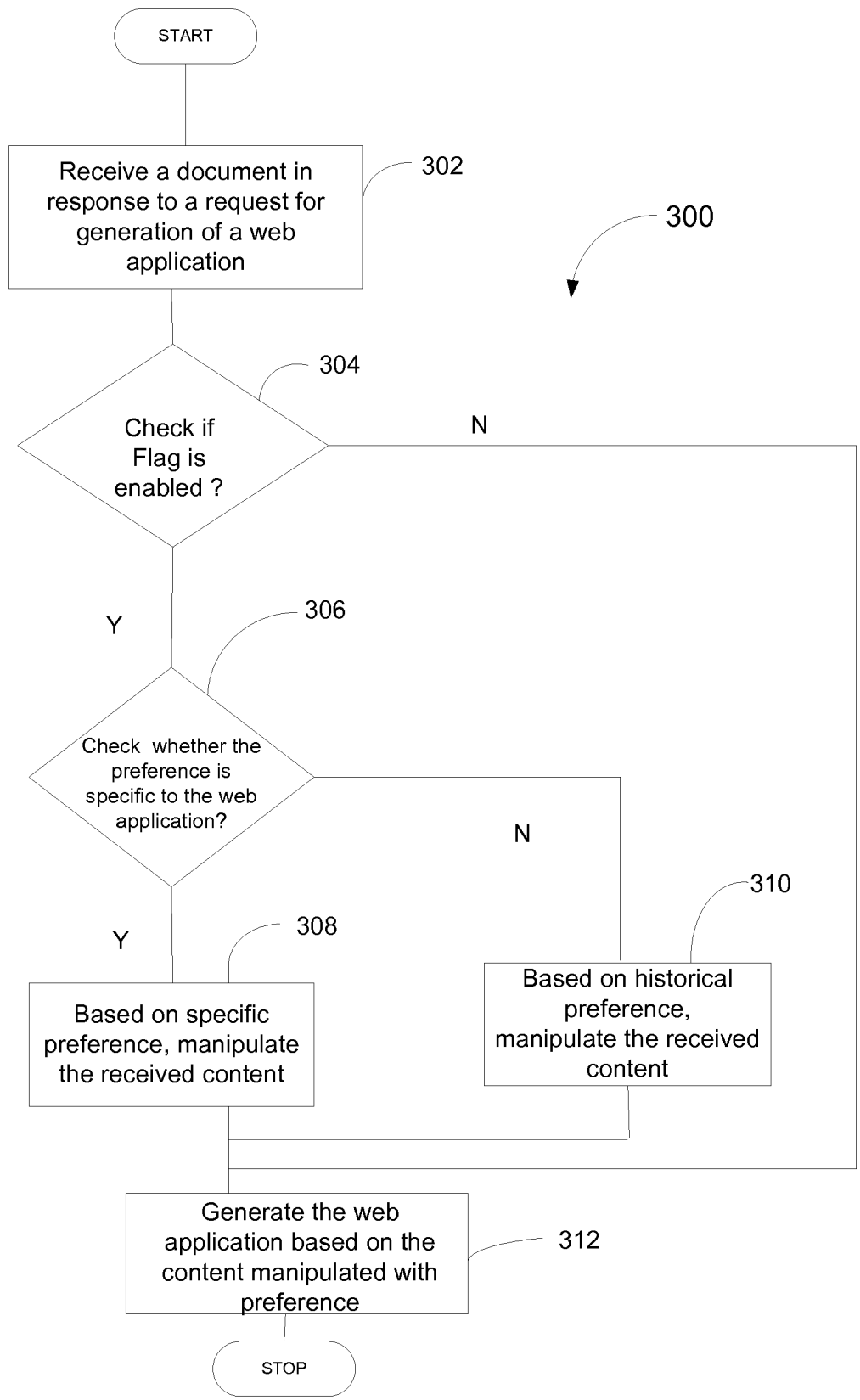
FIG. 3 illustrates an example process of generating the web application according to an embodiment.

With reference to FIG. 3, the embodiments provide a process for generating the web application based on the preference provided as input by the user. The URL of the requested web application may be tracked and identified to fetch the requested document (at the server). Once the document corresponding to the requested web application is received, the document may be manipulated before being configured for generation of the web application. The received document contains information/data on the various components forming part of the web application, content of the one or more of the various components may be modified/edited before the document is forwarded to the device requesting the web application. In the received document, data characterizing the components which may form part of the information required to generate the web application, is read to determine if the respective data (of the various components) can be manipulated based on the preference as provided by the user. The process 300 includes:

Block 302: receiving a document (at the server) in response to the request for generating the web application. The request for generating the web application may be made from a browser at the graphical user interface. The received document contains data/information on the various components that form part of the web application. The data of the various components can be identified.

Block 304: further to the received document, checking whether a flag is enabled or not, corresponding to the user making the request for the generation of the web application. If yes, proceed to block 306. If not, proceed to block 312.

Block 306: after the determination that the flag is enabled for the user requesting the web application, a further determination is done to know whether the preference is specific to the requested web application, and if yes, proceed to block 308 and if no, proceed to block 310.

Block 308: based on determining that the preference is specific to the requested web application, the associated preference is retrieved from the repository and the HTML snippet and/or web-annotation associated with the preference is integrated in the corresponding received document. In one implementation, the data as in the received document is mapped with the associated preference required for generating the web application. After the mapping of the data, the code associated with the preference is integrated into the data such that the received document is changed with the user provided preference.

Block 310: based on determining that the preference provided by the user is general and not specific in particular to the requested web application, the procedure as above is repeated. The data (of the various components) as in the received document is mapped with the corresponding preference as provided by the user. Based on mapping the data (corresponding to the respective component) and the preference (general/historic), the code associated with the preference as provided by the user for the identified component is retrieved and integrated into the received document such that the received document is manipulated with the preference as provided by the user. The historic or general preference may be for the component forming part of the web application.

Block 312: once the document containing the data is manipulated with the preference, the changed/modified document is used for generating the web application. The changed/modified document is forwarded to the device requesting the web application for display of the web application generated based on the preference provided by the user.

The various embodiments implementing the method have been described with respect to accompanying drawings. Those skilled in the art may understand that the method may be implemented in software, hardware or combinations of software and hardware. Moreover, those skilled in art may understand that by implementing various steps of the above method in software, hardware or combinations of software and hardware, there may be provided a configuring environment 400 in which example embodiments of the inventive subject matter may be practiced as shown.

Figure 4:
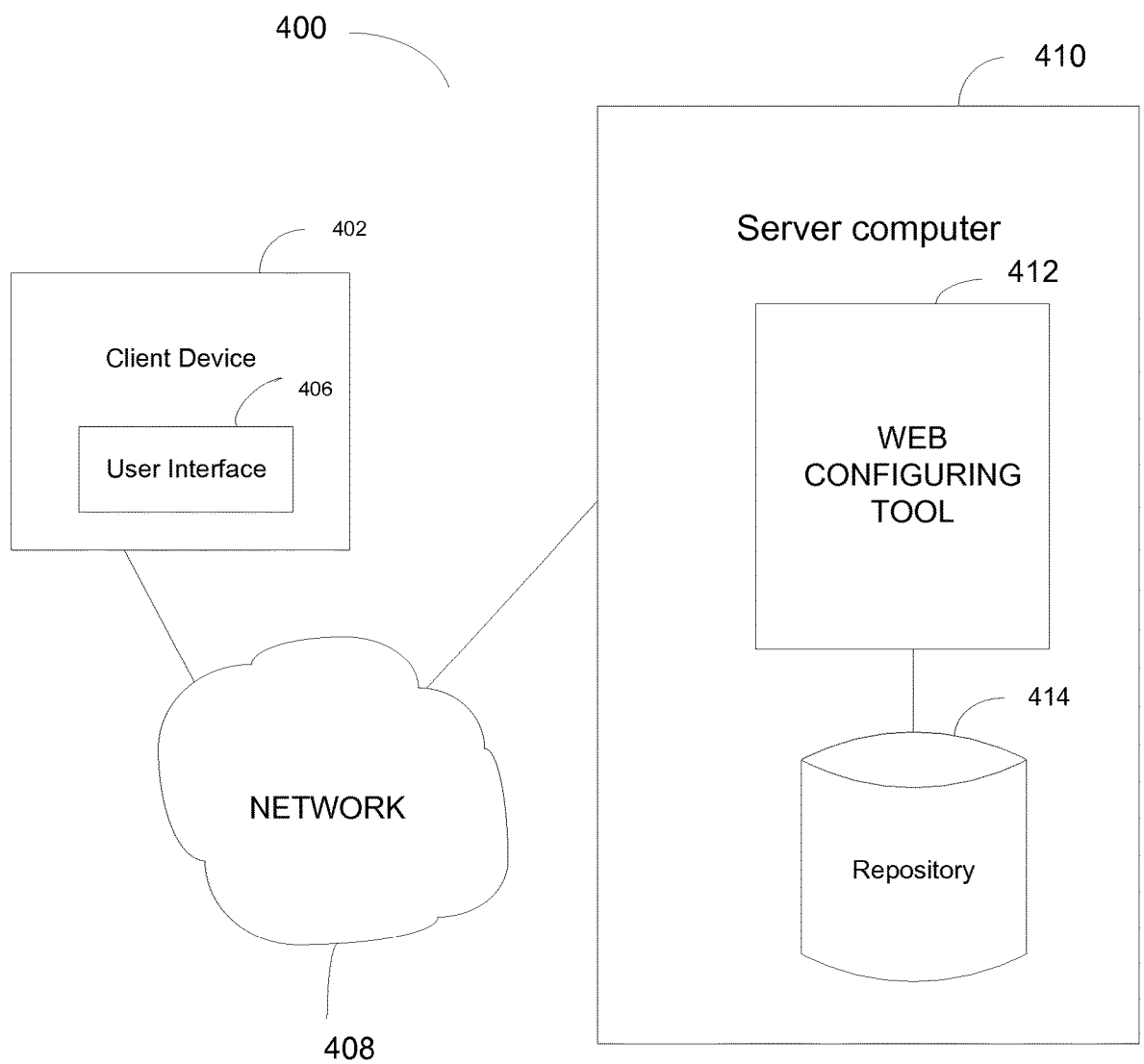
FIG. 4 illustrates an exemplary schematic structural diagram of a configuring environment for generating the web application according to an embodiment.

In FIG. 4, is shown the configuring environment 400 in accordance with an embodiment. The configuring environment 400 comprises a client device 402 communicatively coupled via a network 408 to a server computer 410. In example embodiments, the client device 402 comprises a plurality of client devices. The client device 402 may be user devices (e.g., laptop, desktop computer, mobile device, tablet etc.) that are linked via the network 408 with the server computer 410 to allow the server computer 410 to provide software functionalities to the client device 402. The network 408 may comprise, the Internet, a wireless network, a cellular network, etc. that allows for exchange of communication.

In one embodiment, the server computer 410 is an on-demand system which is hosted by a service provider. The on-demand system comprises one or more network applications that provide support and services to a customer without the customer having to host the system on their premises. That is, the service provider hosts (offers, provides, implements, executes one or more operations of) the system and the customer access functionalities online through a software-as-a-service (SaaS) model.

In one embodiment, the server computer 410 includes a web configuring tool 412 that provides the software functionality to the client device 402 including displaying information to be utilized for rendering of screens (GUIs) on the client device 402. The information may include content for personalization of the web application. In one example, the web configuring tool 412 may be invoked by a user on a client device 402 (a personal computer).

In one embodiment, in the client device 402 there may be included a user interface (UI) 406. The web configuring tool 412 may have a display screen 500 (described in details below in FIG. 5) at the user interface 406. The web configuring tool 412 allows the user of the client device 402 to provide the preference for a layout for the web application. The web configuring tool 412 can be used to create various media including but not limited to web based applications etc. The disclosed implementation may be applicable over markup language editors such as HTML or XHTML.

The components forming part of the web application can be built using various web technologies including, for example, a markup language (e.g., HTML, XHTML), Cascading Style Sheets (CSS), Java Script®, etc. The components may be invoked through the web configuring tool 412 or in the browser (e.g., Chrome®, Safari®, IE®) at the user interface (UI) 406.

Figure 5:
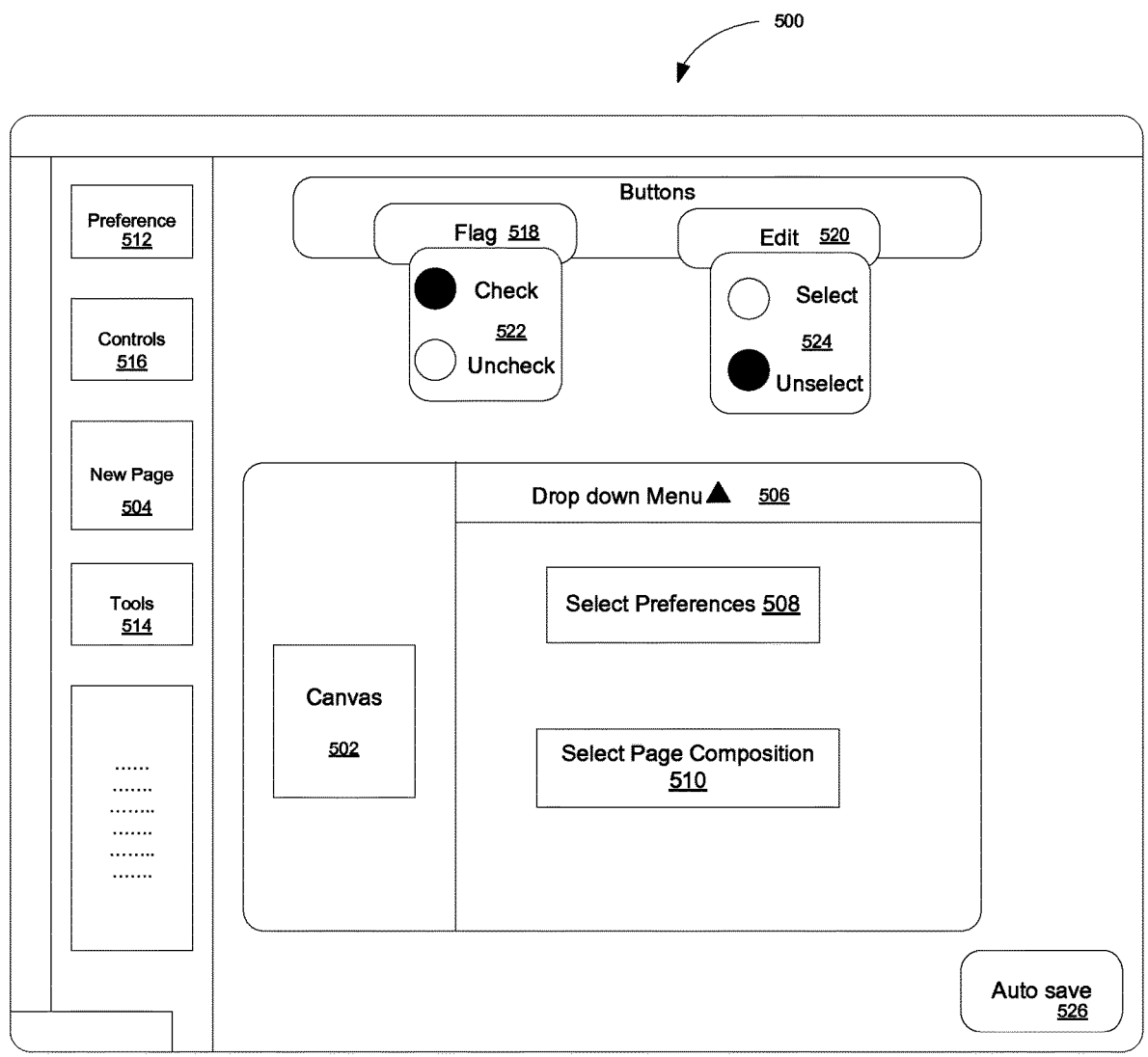
FIG. 5 illustrates an exemplary schematic display screen according to an embodiment.

Referring to FIG. 5, in an embodiment, the display screen 500 at the user interface (UI) 406 of the client device 402 may be a front end of the web configuring tool 412 loaded on a user's browser as shown in FIG. 5. Through the display screen 500, the user may be allowed to personalize a content of the web application to be provided at the user interface (UI) 406. The user may provide preference for applications such as functions, elements, controls, widgets, which represent various components forming part of the web application.

At the display screen 500, the user may input a preference for one or more components which may form part of the setup to be utilized to define the layout of the web application. In one embodiment, the user may create the preference on the display screen 500. The user may create the new preference on a canvas 502 in the display screen 500. In one implementation, the preference for one or more components may be built newly by selecting a new page 504 on the canvas 502. As shown, the canvas 502 is a portion of the display screen 500. The user can expand the size of the canvas 502.

In some implementations the user can select a predefined preference from preference 512. The preference 512 for various components can be invoked on the display screen 500 using controls 516.

The user may be allowed to select the preference 512 using controls 516. The controls 516 may be invoked on initializing check 522 under button flag 520. Once flag 520 is checked, an edit button 522 may open to select or deselect 524 several buttons under controls 516 and/or tools 514 (not shown).

The preference 512 may be shown under distinct labels representing various components such as elements/functions/controls/widgets. The preference 512 may classify the various components under class heads for ease of showing the one or more components to the user.

In one embodiment, there may be a drop-down menu 506 populated as a dialog box to the user. The drop-down menu 506 may display components required for composition of the web page. The user may select the preference under labels such as select preferences 508, and/or attributes belonging to the components from select page composition 510. The drop-down menu 506 may be used to populate labels under select preferences 508, and select page composition 510, from the preference 512, in the display screen 500 of the user interface (UI) 406 of the client device 402.

In some implementations, the select preferences 508 may include classified attributes corresponding to various controls/functions/elements. In one embodiment, the selection of attributes (e.g., font, size, location, orientation, color, opacity, texture, shapes, shadows, animation) may be defined separately under select page composition 510. The select page composition 510 may include links to the HTML snippets and/or web-annotations. The select preference 508 and/or select page composition 510 may further include information corresponding to values defining various attributes of the selected preference.

In one embodiment, the user may be allowed to input the preference respective to the component. In another embodiment, the user may be allowed to input the preference specific to the web based application. In yet another embodiment, the user may be allowed to input preferences for various components collectively forming part of the web application. The user may be allowed to edit, modify or delete the existing preference. Such an interaction of the user in the display screen 500 may be recorded using mouse clicks or key pad or touch screen. In some implementations, the user may be manipulating features of an existing component using tools 514. The tools 514 include a variety of editing tools for creating and modifying components using different brushes, shapes, paints, navigation tools, and handles for capturing values describing properties of the inputted preference corresponding to the component. In one embodiment, the tools 514 may include a text editor that allows display and modification of an existing source code.

In one example, the newly/manually created preferences may be added to the database containing a list of the preferences predefined for the one or more components.

The preference as provided by the user can be saved using auto save 526.

Referring back to FIG. 4, the web configuration tool 412 may track and collect the preference as inputted by the user from the client device 402. The web configuration tool 412 may associate the preference with the user by assigning the tag. The web configuration tool 412 may include for the components predefined HTML snippets and/or web-annotations. The web configuration tool 412 may be configured to associate the predefined HTML snippet and/or web-annotations corresponding to the preference for the respective component. In one embodiment, the web configuration tool 412 may be configured to associate the preference as inputted by the user with the corresponding web-annotation. In another embodiment, the web configuration tool 412 may be configured to associate the preference (respective to the component), HTML snippet and the web-annotation using the tag. In yet another embodiment, the web configuration tool 412 may be configured to associate the preference specific to the web application using the tag. In one embodiment, the web configuration tool 412 may be enabled to generate HTML snippets corresponding to the preference as defined by the user. In another embodiment, where the components are modified, the web configuring tool 412 may be enabled to associate the values of the preference to the predefined HTML snippet. The web configuration tool 412 may be further configured to update the preference as inputted by the user on an ongoing basis.

Responsive to the user defining the inputted preference, the web configuration tool 412 may be enabled to track and collect the user inputted preference in a repository 414. The repository 414 is a database of the user selected/created/modified preference. The repository 414 may be located anywhere in the environment 400. The repository 414 can be implemented with any type of storage device capable of storing data that can be accessed and utilized by server, a hard disk drive or a flash memory. In one implementation, the web configuration tool 412 may include the repository 414. In another implementation, the web configuration tool 412 may communicate with the repository 414 located in the server computer 410. In yet another implementation, the web configuration tool 412 may be configured to communicate with the repository 414 located in the client device 402 (not shown).

In one implementation, the web configuration tool 412 may maintain and store the preference associated to the user in the repository 414. In another embodiment, the web configuration tool 412 may maintain and store the preference of the user which may be specific to the web application in the repository 414. In yet another example, the web configuration tool 412 may store the preference, the corresponding web-annotations and/or HTML snippets in the repository 414. In yet another embodiment, the web configuration tool 412 may use the tag as an identifier to maintain and retrieve the identity of the user, associated preferences, web-annotations, HTML snippets and/or the web applications in the repository 414.

In one implementation, the web configuring tool 412 may include an Application Programming Interface (API) that provides the capability to interact with the server computer 410. When the document corresponding to the requested web application is received at the server computer 410, the web configuration tool 412 may interact with the server computer 410 to establish an identity of the user requesting the web application. The web configuration tool 412 may be configured to further interact with the client device 402 requesting the web application to determine whether the flag is enabled in the client device 402. Based on the determination that the flag is enabled in the client device 402, the web configuration tool 412 may be configured to interact with the server computer 410 to identify data forming part of the document received. The web configuration tool may figure out from the repository 414, if there exists the preference provided by the user requesting the web application. The web configuration tool 412 may be configured to retrieve the preference corresponding to the user requesting for the generation of the web application from the repository 414. The web configuring tool 412 may be further configured to interact with the server component 410 to associate the preference of the user with the respective data forming part of the document received. The web configuration tool 412 may be further configured to integrate the HTML snippets corresponding to the preference with the identified data forming part of the document received. In one implementation, the web configuration tool 412 may be configured to identify the keyword (representing the web-annotation) as in the document received and integrate the code corresponding to the preference standardized with the respective web-annotation into the received document.

The web configuration tool 412 may be further enabled to communicate with the server component 410 to forward the modified/changed document to the client device 402. In one embodiment, the web configuration tool 412 may forward the modified/changed document to the client device 402. In one implementation, the web configuring tool 412 may be enabled to coordinate with the client device 402 receiving the modified/changed document containing the integrated user inputted preference.

The client device 402 may parse the modified/changed document integrated with the preference into DOM nodes. The client device 402 may parse the data in the document for rendering and generating the web application based on the user provided preference. In one implementation, the web configuration tool 412 may associate with the client device 402 to generate the web application by parsing the modified/changed document. The client device 402 generates the web application based on the preference as provided by the user and display the web application at the user interface (UI) 406.

Through the client device 402 the user may be prompted to input the preference and the web configuring tool 412 may keep updating the user provided preference in the repository 414 on an ongoing basis.

The flowchart and block diagrams in the FIGS. 1-5 illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description of the various embodiments have been provided for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for providing a personalized web application, the method comprising:
   receiving, by a processor, a request for a web application;
   retrieving, by the processor, a user preference, wherein the user preference contains one or more values, wherein the user preference is identified using a tag, and wherein the tag is used to derive an HTML snippet:
   identifying a component of the web application based upon the user preference, wherein the component is associated with the one or more values contained in the user preference; and
   generating, by the processor, the web application based at least in part on the user preference, wherein generating the web application comprises receiving a document corresponding to the component, wherein the HTML snippet is integrated into the document, and wherein the one or more values contained in the user preference is integrated into the document without replacing data of the document as a whole.

2. The method of claim 1, wherein the user preference corresponds to a web-annotation and includes a standardized preference.

3. The method of claim 1, wherein the user preference specifies at least one of content, a style and an interface.

4. The method of claim 1, wherein the user preference is inputted via a web configuration tool.

5. The method of claim 1, wherein the one or more attributes values include at least one of location, size, font, text color, width, and margins associated with the component.

6. The method of claim 1, wherein the tag associates the component with a corresponding source code.

* * * * *